United States Patent [19]
Kobayashi

[11] 3,863,379
[45] Feb. 4, 1975

[54] APPARATUS FOR AUTOMATIC ANGLING ON FISHING VESSEL

[76] Inventor: Tadashi Kobayashi, 1560-2 Tenma, Fuji, Japan

[22] Filed: July 2, 1973

[21] Appl. No.: 375,702

[52] U.S. Cl............................ 43/6.5, 43/15, 43/19.2
[51] Int. Cl.............................................. A01k 79/00
[58] Field of Search............. 43/16, 15, 19.2, 5, 6.5

[56] References Cited
UNITED STATES PATENTS

| | | | |
|---|---|---|---|
| 3,192,659 | 7/1965 | Rice........................................ | 43/15 |
| 3,365,833 | 1/1968 | Christiansen........................... | 43/15 |
| 3,691,668 | 9/1972 | Strebig.................................. | 43/19.2 |
| 3,710,499 | 1/1973 | Tadano................................. | 43/15 X |

*Primary Examiner*—Warner H. Camp
*Attorney, Agent, or Firm*—George B. Oujevolk

[57] ABSTRACT

Automatic angling arrangement for use on a fishing vessel wherein the fish leading motion of the fishing rod in the down position, lifting of the rod with acceleration to the up position following hooking-of-a-fish signal, shaking of the rod in the up position to unhook the fish, and lowering of the rod to the down position after the fish is unhooked preparatory to resuming fish angling are carried out automatically in a cycle.

4 Claims, 18 Drawing Figures

APPARATUS FOR AUTOMATIC ANGLING ON FISHING VESSEL

BACKGROUND OF THE INVENTION

The present invention relates to apparatus for automatically angling fish, for use on ocean fishing vessels, mainly for bonito, and more specifically to apparatus wherein fluidic elements are used to control an automatic cycle of angling steps, consisting of a fish angling and leading motions of the fishing rod in a down position, sensing of a hooked signal given by a hooked fish, acceleration during the lifting of the fishing rod, lifting of the rod to the up position, shaking of the rod in the up position to unhook the fish, and lowering of the rod back to the down position after the fish is unhooked, preparatory to resuming fish angling, as well as handling the fishing rod at the beginning and end of a fishing operation.

BRIEF DESCRIPTION OF THE PRIOR ART

Heretofore, automatic ocean fishing apparatus for bonito and other fish have been controlled by mechanical or electrical control systems, but have usually failed due to a number of unfavorable operating conditions. For example, the sea is not always calm, and it is often necessary to operate the apparatus even in bad weather when the apparatus is apt to be hit by waves, particularly because they are usually installed on the side of the ship. Under such conditions, they tend to be affected mechanically, corroded by seawater, or develop a short circuit, resulting in breakdown.

The disadvantages of conventional, electically operated and controlled apparatus are breakdown of the apparatus due to inoperable electrical contacts corroded by seawater, ship corrosion, accelerated by electric current leakage, difficulty in troubleshooting, and high possibility of losing opportunities for fishing under conditions unfavorable for the operation of electric devices.

The disadvantages in conventional, mechanically operated and controlled apparatus are lack of quick response in that a mechanical apparatus often fails to respond with sufficient speed for successful fishing, and a mechanical apparatus needs a highly complex control for successful fishing, and therefore have to be quite large in size and weight. A ship for catching such fish as bonito usually sails far out on the ocean, consequently, it must carry substantial quantities of provisions for the crew, water, fuel and daily necessities, and also must provide for the storage of catches. These factors as well as consideration for the safety of the vessel tend to limit the size and weight of the fishing apparatus that can be installed aboard.

For the foregoing reasons, it has been considered rather difficult to develope an automatic fishing apparatus that is satisfactory to common users both in operation and control performance.

OBJECTS OF THE INVENTION

It is an object of the present invention to provide a fishing arrangement based thereon that is free of the above-mentioned disadvantages of conventional fishing apparatus, lightweight and easy to handle, and capable of catching such fish as bonito in an almost unattended manner.

Another object of the present invention is to provide an arrangement that permits an automatic cycle of essential fishing steps on a fishing vessel, namely, a fish leading motion of the fishing rod in the down position, lifting of the rod with acceleration to the up position following fish-is-hooked signal, shaking of the rod in the up position to unhook the fish, and lowering of the rod back to the down position, and convenient procedures for handling the fishing rod at the beginning and end of a fishing operation.

The invention also contemplates providing an arrangement for automatic angling that solves the foregoing problems by using fluidic elements actuated by low-pressure pneumatic control inputs to give instructions to control what might be called the brain of the fishing apparatus so that it can compare in responsiveness with electrically controlled machines.

Before this embodiment of the present invention is described in detail with reference to these drawings, some terms used herein should be defined, as used in the context of the present invention:

DEFINITIONS

The down position means the position assumed by the fishing rod at the lower end of its stroke when it extends roughly level;

The up position means the position assumed by the fishing rod at the upper end of its stroke when it stands roughly upright;

Fish leading means moving the fishing rod up and down within certain limits in the down position, i.e., "playing";

A fish-is-hooked signal means a control input produced by a selector valve when it has been actuated by the weight of a hooked fish;

Acceleration means increasing the lifting speed of the fishing rod when the rod has reached a certain level from the down position with a hooked fish;

Shaking the fishing rod in the up position means shaking the rod up and down near the upper end of its stroke to unhook a fish which has not left the hook with the rod reaching the up position;

Throwing down the fishing rod means lowering the rod from the up position to the down position.

Other objects and advantages will become apparent from the following description taken in conjunction with the accompanying drawings in which:

DETAILED DESCRIPTION

Figure 1:
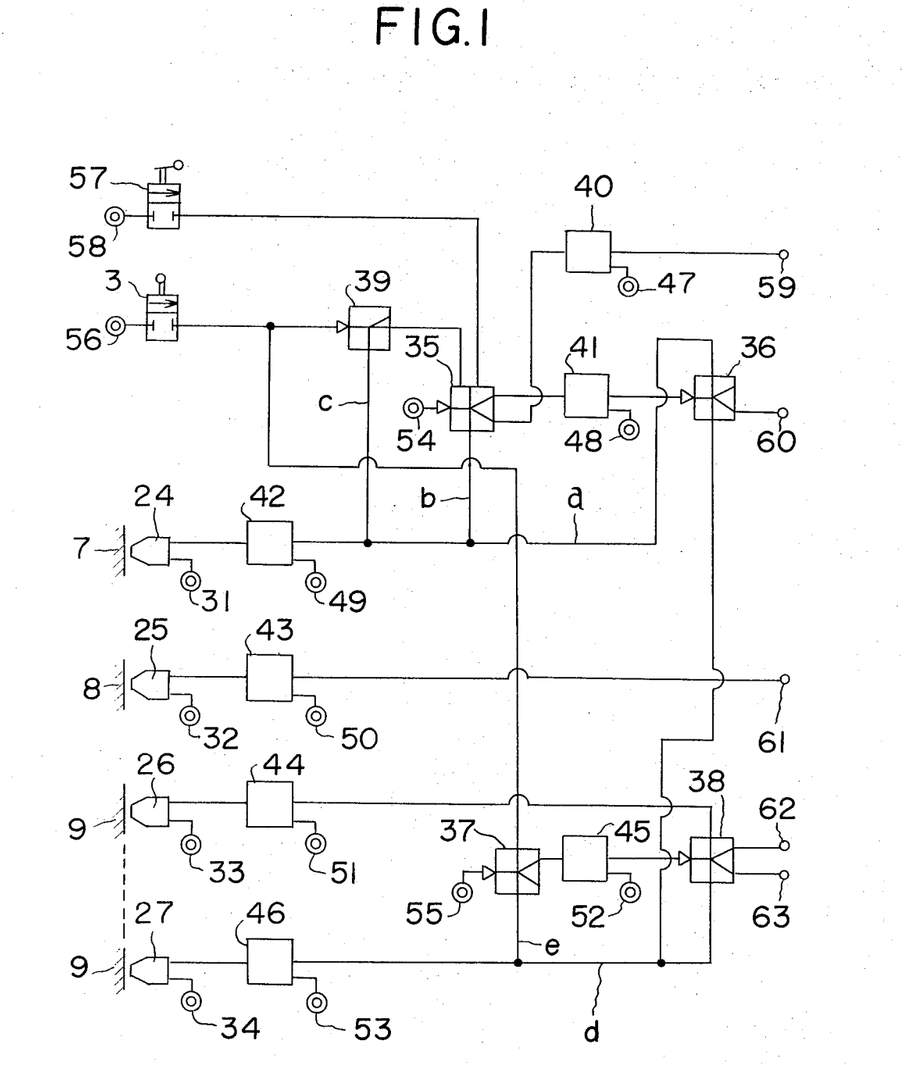
FIG. 1 is a schematic diagram of an apparatus embodying the present invention involving fluidic elements.
Figure 15:
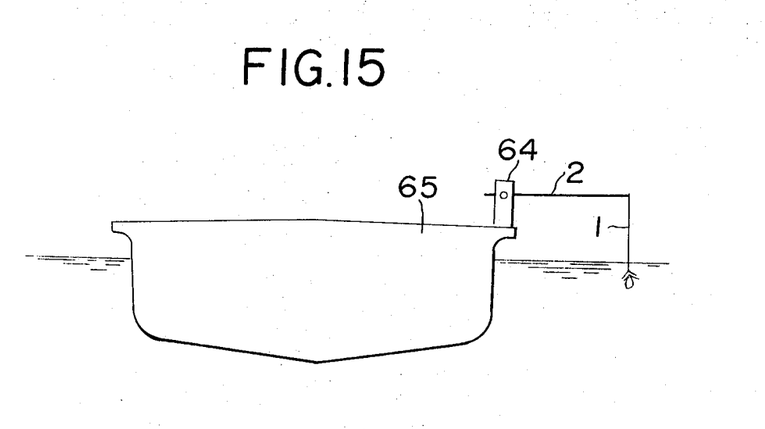
FIG. 15 is a schematic front view of said apparatus installed on a fishing vessel.
Figure 16:
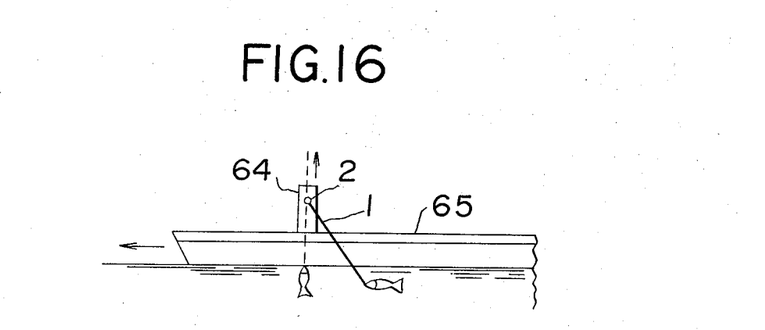
FIG. 16 is an illustraion of drift angling on a fishing vessel.
Figure 17:
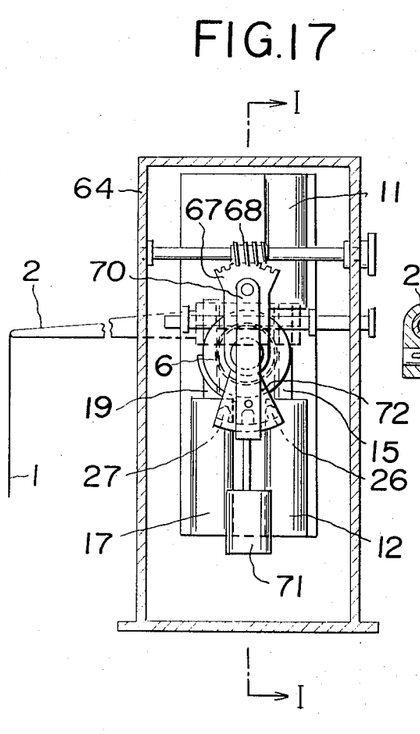
FIG. 17 is a diagrammatic illustration of said apparatus in vertical section with its various components contained therein; and, FIG. 18 is a sectional view of said case taken on line I—I in FIG. 17.

The mechanical components of this embodiment of the present invention will now be described. A fishing line 1 runs through a fishing rod 2 and is connected to a selector valve 3 (FIG. 1) attached to the bottom end of the rod 2 (FIGS. 15-17).

The rod 2 is connected near the bottom via a holder 4 to a revolving shaft 5, on which a revolving ring 6 is mounted coaxially. This ring carries around it a cam 7 for lowering the fishing rod 2, a cam 8 for acceleration, and a cam 9 for fish leading (FIGS. 10-14).

Figure 2:
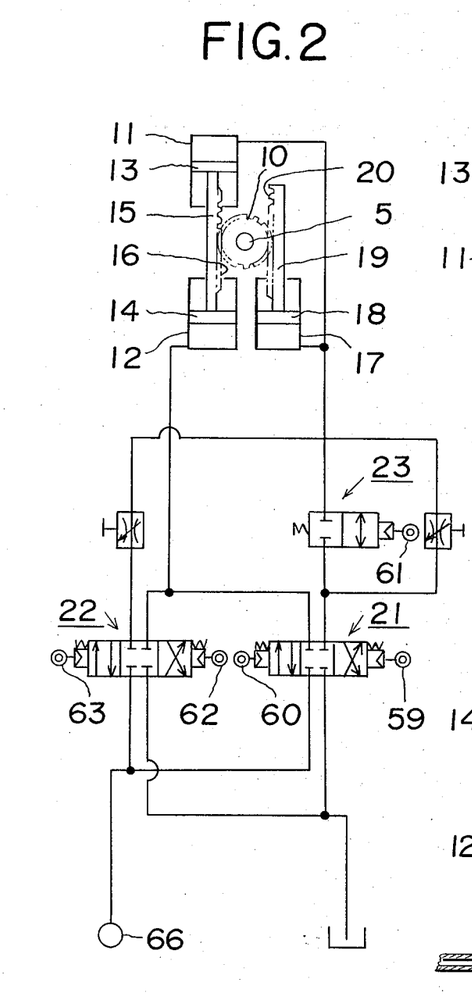
FIG. 2 is a schematic diagram of the hydraulic system of said apparatus.
Figure 3:
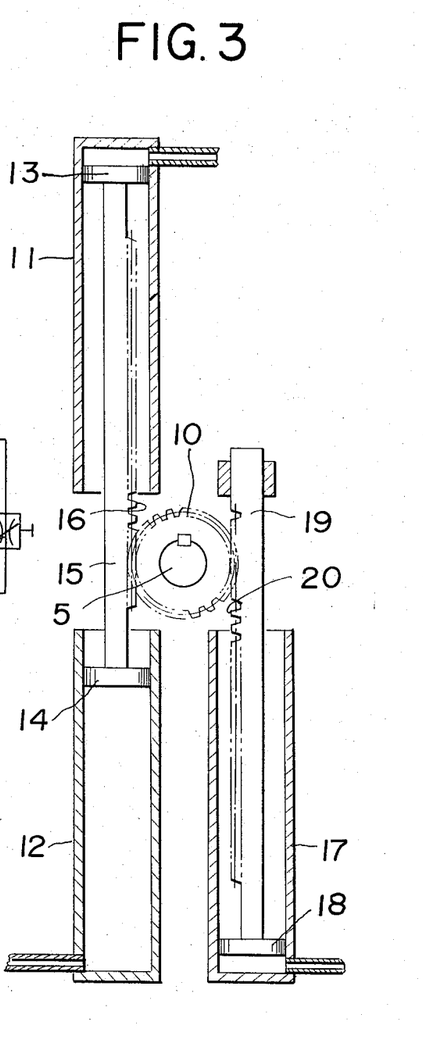
FIG. 3 is a front view of a part of said apparatus in vertical section illustrating the relationship between the pistons and revolving shaft thereof.

The revolving ring 6 has a gear 10 coaxially mounted on it, and this gear 10 is in mesh with a rack 16 mounted on the piston rod 15 of pistons 13 and 14 which reciprocates in hydraulic cylinders 11 and 12, respectively, and with a rack 20 mounted on the piston rod 19 of a piston 18 which operates in a hydraulic cylinder 17 installed opposite the cylinder 12. Referring to FIG. 2, as the piston 13 moves down and the piston 18 up, the revolving shaft 5 turns counterclockwise since the racks 16 and 20 are in mesh with the gear 10, and causes the fishing rod 2 to rise.

In FIG. 2, numeral 21 and 22 refer to hydraulic line control valves, which are four-port three-position spring-centered selector valves, and numeral 23 refers to a control valve for acceleration. These valves cause the pistons 13 and 14 to move up and down, and the piston 18 to move up.

Figures 4, 5, 6, 7:
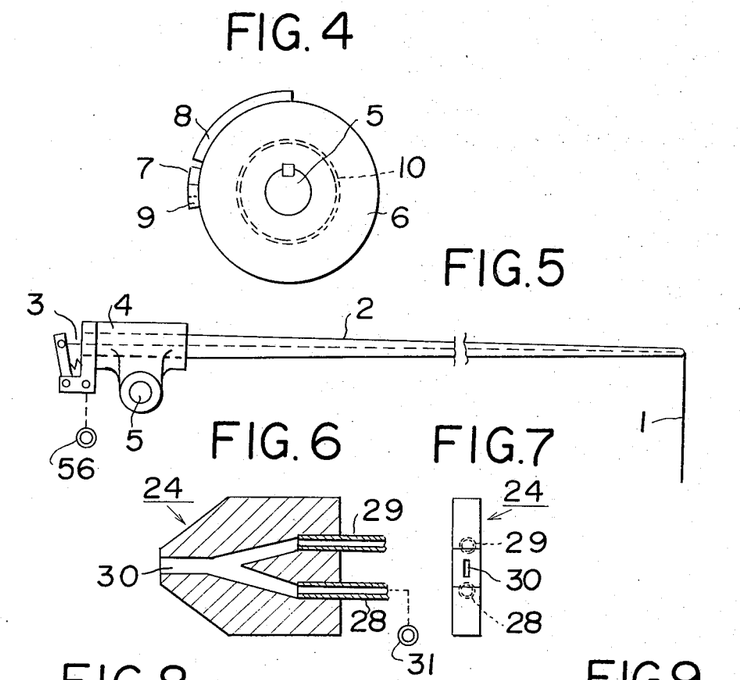
FIG. 4 is a front view of the component illustrating the relationship between the revolving shaft and revolving ring thereof.
FIG. 5 is a diagrammatic side view of the fishing rod holding assembly of said apparatus.
FIG. 6 is a vertical, sectional view of a sensor of said apparatus.
FIG. 7 is a front view of said sensor.
Figure 8:
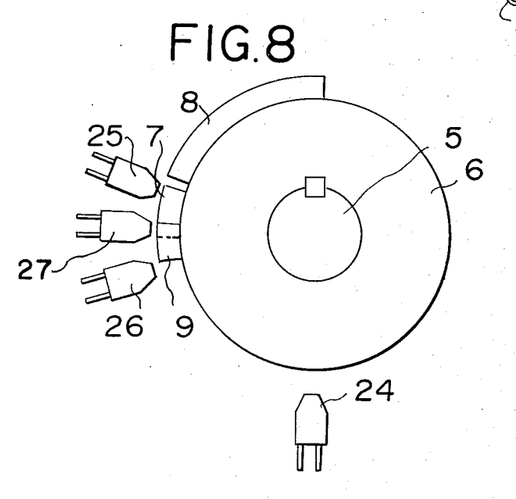
FIG. 8 is a front view of a part of said apparatus showing the relationship between the sensors and the cams thereof.
Figure 9:
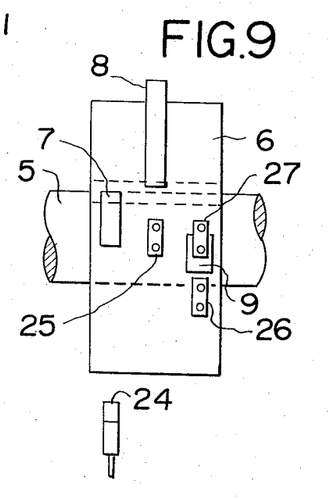
FIG. 9 is a side view of said apparatus.
Figure 10:
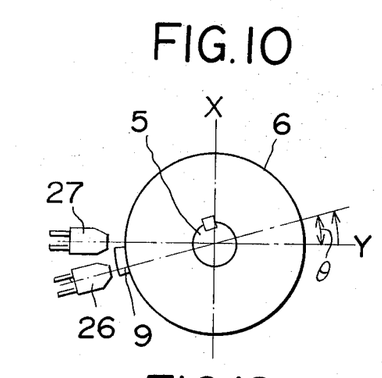
FIGS. 10, 11, 12 and 13 are front views of said apparatus illustrating how the sensors and the cams operate in relation to each other.

The present embodiment of the invention involves the use of four sensors: namely, a lowering sensor 24, an acceleration sensor 25, a fish leading censor 26, and a throwing-down sensor 27. Each of these sensors, as illustrated in FIGS. 6 and 7, has an air inlet 28, an air outlet 29, and a jet port 30, and the passages for the inlet 28 and the outlet 29 join behind the jet port 30. From an air supply 31, low-pressure air flows into the sensor through the inlet 28, and normally blows out through the jet port into the atmosphere. If the object to be sensed, for example, the cam 7, comes opposite the jet port 30, the air hits the cam and flows backward producing a back pressure and flowing out through the outlet 29 to provide a control input signal. Numerals 32, 33, and 34 refer to air supplies for the sensors 25, 26, and 27, respectively.

The present embodiment of the invention also incorporates four fluidic flip-flop elements 35, 36, 37, and 38, and a fluidic OR-NOR element 39. The structure and functioning of these elements need not be described in detail herein since they are of the types now commonly known.

Numerals 40 through 46 refer to fluidic amplifiers, 47 through 53 to air supplies for these amplifiers, 54 to an air supply for the flip-flop 35, 55 to an air supply for the flip-flop 37, 56 to an air supply for the valve 3, 57 to a push-button valve, 58 to an air supply therefor, 59 to a lifting terminal, 60 to a lowering terminal, 61 to an acceleration terminal, 62 to a fish leading up terminal, and 63 to a fish leading down terminal.

Figure 18:
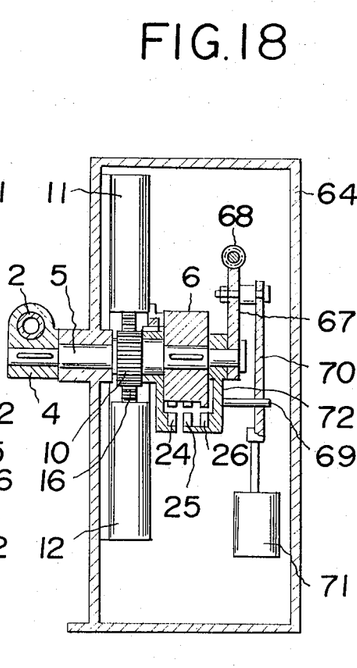

As shown in FIGS. 17 and 18, these control and operative components are tightly enclosed in a case 64, which is installed on the edge of a fishing vessel 65 and supports the fishing rod 2.

In the figures, numeral 67 refers to a revolving plate, 68 to a revolving shaft, 69 to a guide pin, 70 to a suspension plate, 71 to a weight, and 72 to a sensor mount.

OPERATION OF THE INVENTION

Figure 11:
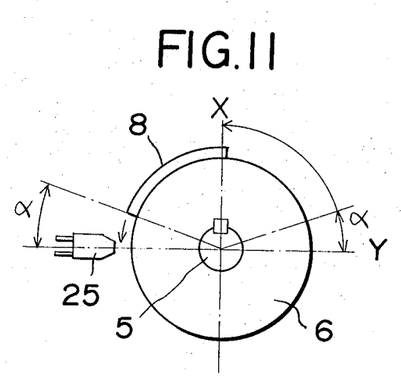

The apparatus in the present embodiment of the invention is controlled and operated automatically in the following manner:

First, as explained hereinafter, the push-button valve 57 is closed by a remote control means to bring the fishing rod 2 to the down position Y, where the rod is kept in a fish leading motion. As a fish is hooked, its weight pulls the fishing line 1 down, and causes the selector valve 3 to close. Consequently, a low-pressure flow from the air supply 56 enters the OR-NOR element 39, through which it further enters the flip-flop 35 as a control input, and causes a low-pressure air flow (main flow) from the air supply 54 to switch over to the lifting side. The latter air flow, together with that from the air supply 47 for the amplifier 40, reaches the lifting terminal 59. This combined air flow actuates the hydraulic line control valve 21 to supply hydraulic oil from a hydraulic oil supply 66 to the cylinder 11 and lower the piston 13, which accordingly drives the rack 16 and the gear 10 in mesh therewith, thus turning the revolving ring 6 and the revolving shaft 5, and causing the fishing rod 2 to go up (see FIG. 2). As the rod 2 rises to a certain angle $\alpha$ as shown in FIG. 11, the acceleration cam 8 actuates the acceleration sensor 25, thus reversing the air flow from the air supply 32 and producing a back pressure. This air flow, together with that from the air supply 50 for the amplifier 43, reaches the acceleration terminal 61, through which it actuates the acceleration control valve 23 to supply hydraulic oil from the hydraulic oil supply 66 to the cylinder 17 which raises the piston 18. The upward motion of this piston 18 and the above-mentioned downward motion of the piston 13, drive their respective racks 16 and 20 and the gear 10 in mesh therewith, thus turning the revolving shaft 5 and causing the fishing rod 2 to rise quickly. As the rod 2 reaches the up position X, the cam 8 leaves the sensor 25, allowing the air flow from the air supply 32 to be released into the atmosphere, and bringing the acceleration action to a halt.

Figures 12, 13, 14:
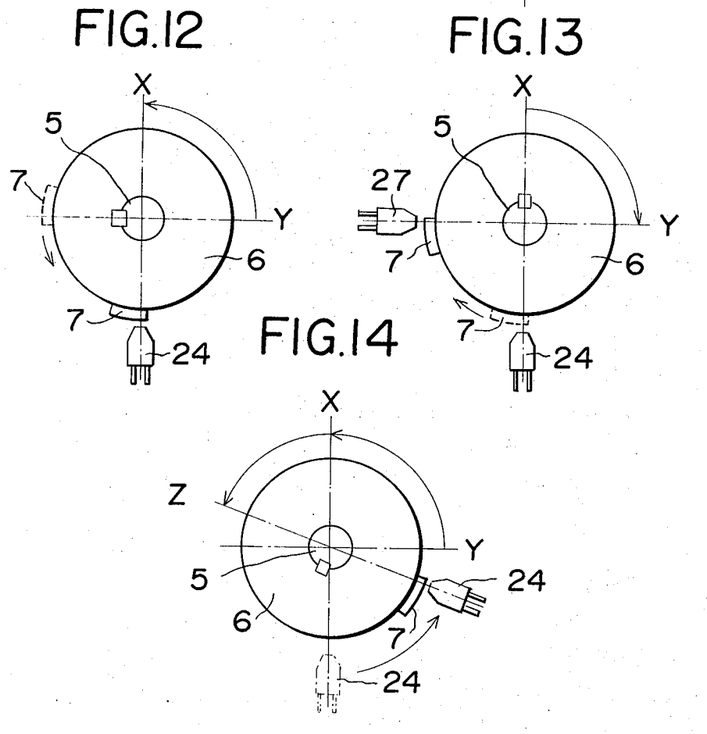
FIG. 14 is a front view showing how one of the sensors is shifted when a fishing operation is to be suspended.

Such acceleration is required for the reason that during drift angling carried on while the fishing vessel is sailing, the fishing line 1 tends to trail behind. This means that, when a fish is hooked, it lies behind the position of the fishing rod 2. If the rod is raised quickly in this condition, the lifted fish may drop, or be thrown down anywhere aboard, and this is likely to reduce the efficiency with which the fish can subsequently be unhooked and otherwise handled. This problem can be solved in the manner shown in FIG. 16. That is, when a fish has been hooked, the fishing rod 2 is first lifted at a moderate speed until the fish is drawn by its own weight to a point roughly under the fishing rod 2. Then the fish is lifted quickly at an increased speed so that it will drop in the neighborhood of a specific spot aboard. As the fishing rod 2 reaches the up position X, the cam 7 comes opposite the sensor 24, as shown in FIG. 12, thus reversing the low-pressure air flow from the air supply 31 and producing a back pressure. This air flow, together with that from the air supply 49, provides a control input for the flip-flop 36, and switches the direction of the main flow therethrough to the lowering side. Meanwhile, the same air flow, branching from line a for the flip-flop 36 into line b, provides a control input for the flip-flop 35, in which it switches the direction of the main flow to the lowering side. Consequently, a low-pressure flow from the air supply 54, together with that from the air supply 48 for the amplifier 41, reaches the lowering terminal 60 through the flip-flop 36. In this case, if the fish has already been unhooked from the rod 2 in the up position, the main flow through the flip-flop 35 is on the lowering side because the hooking signal, namely, the air flow from the air supply 56, is no longer present. If the fish has not yet been unhooked, the air flow from the air supply 56 continues to run through the OR-NOR element 39 to the flip-flop 35. Moreover, the control input from the sensor 24 is no longer present. Consequently, the direction of the main flow through the flip-flop 35 is switched over to the lifting side, and the air flow (main flow) from the air supply 54 goes to the lifting terminal, causing the fishing rod 2 to go up in the manner already described herein. As the revolving ring 6 turns in the lifting direction, the cam 7 again comes opposite the sensor 24, which accordingly provides a control input to switch the main flow through the flip-flop 35 over to the lowering side, causing the fishing rod 2 to go down. By moving the rod 2 up and down repeatedly in this manner, that is, by shaking it vertically, the fish may be unhooked. If the fish clings to the hook and the cam 7 comes opposite the sensor 24, a control input through the line c switches the main flow through the OR-NOR element over to the atmosphere side, and suspends the flow to the lifting side.

With the fish thus unhooked and the fishing rod 2 shifting from upward to downward motion, the revolving ring 6 turns clockwise, and the cam 7 leaves the sensor 24. Consequently, the control input from the sensor 24 is suspended. But since the flip-flops 35 and 36 are kept in the position for directing the main flow to the lowering side, the air flow (main flow) from the air supply 54 goes to the lowering terminal 60, through which this air flow actuates the control valve 21 and allows hydraulic oil from the hydraulic oil supply 66 to enter the cylinder 12 and push up the piston 14, which accordingly drives the rack 16 and the gear 10 in mesh therewith, thus turning the revolving ring 6 and the revolving shaft 5 and causing the fishing rod 2 to go down.

As the fishing rod 2 reaches the down position Y, the clockwise turning of the revolving ring 6 brings the cam 9 to the position opposite the sensor 27, and the air flow from the air supply 34 provides a control input which, together with the air flow from the air supply 53, enters the flip-flop 38 through line d and switches the direction of the main flow therethrough to the shaking up side. Meanwhile, through line e branching from line d, the control input switches the flip-flop 37 over to the lifting side. Accordingly, the main flow from the air supply 55, together with the flow from the air supply 53 for the amplifier 45, reaches the fish leading up terminal 62, through which the combined air flow actuates the hydraulic line control valve 22 and allows hydraulic oil from the hydraulic oil supply 66 to enter the cylinder 11 and lower the piston 13, which accordingly drives the rack 16 and the gear 10 in mesh therewith and causes the fishing rod 2 to go up. As the rod 2 rises to a certain level, that is, as the revolving ring 6 turns counterclockwise to a present angle, θ, the cam 9 comes opposite the sensor 26, thus reversing the air flow from the air supply 33 and producing a back pressure. This air flow, together with that from the air supply 51 for the amplifier 44, provides a control input for the flip-flop 38, and switches the main flow therethrough over to the lowering side. Said main flow, consisting of an air flow from the air supply 55 and that from the air supply 52 for the amplifier 45, then reaches the fish leading down terminal 63, through which this combined flow actuates the control valve 22 and allows hydraulic oil from the hydraulic oil supply 66 to enter the cylinder 12 and raise the piston 14, which accordingly drives the rack 16 and the gear 10 in mesh therewith, thus turning the revolving ring 6 and the revolving shaft 5 and causing the fishing rod 2 to go down. As the rod 2 reaches the down position Y, the clockwise turning of the revolving ring 6 causes the cam 9 to leave the sensor 26 and come opposite the sensor 27. Consequently, the air flow from the air supply 34 for the sensor 27 switches the direction of the main flow through the flip-flop 38 over to the lifting side, and causes the fishing rod 2 to rise by the angle θ in the above-described manner. By repeatedly going through this cycle, the fishing rod 2 automatically moves up and down in the down position to lead fish (see FIG. 10). This motion combines with that caused by a hooking signal, and other up and down motion of the fishing rod 2 between its down position Y and up position X to constitute a complete automatic angling cycle.

In addition to this automatic angling cycle, the present embodiment of the invention also incorporates remote-control or manual means for handling the fishing rod when a fishing operation is to be suspended or started, or when the fishing rod is to be mounted or demounted, or when a fish is to be removed manually from the hook. Specifically, the air supply 58 can be opened and closed by means of the push-button valve 57 either in remote control or manually operated. This valve 57 is connected to the flip-flop 35. The lowering sensor 24 can be shifted in the direction for lifting the fishing rod 2, that is, counterclockwise relative to the revolving ring 6, as shown in FIG. 14. The shifting of the sensor 24 is effected either by high-pressure air in remote control or directly by hand. But this feature need not be described in detail herein because it is merely incidental to the present invention.

When a fishing operation is to be suspended, one should first shift the sensor 24 around the revolving ring 7 in the direction for lifting the fishing rod 2, thus taking the sensor 24 away from the cam 7, and then close the push-button valve 57 to allow the air flow from the air supply 58 to enter the flip-flop 35 as a control input, thus causing the fishing rod 2 to turn from the up position to a position further behind, Z. Now, if one opens the push-button valve 57 before the cam 7 comes to face the sensor 24, the fishing rod 2 stops in position Z, and the fishing operation is suspended (see FIG. 14).

To start a fishing operation when the apparatus is in the above-described state of suspension, one should close the pushbutton valve 57, and then shift the sensor 24 to the position diametrically opposite to position Z. The sensor 24 generates a lowering signal as soon as it comes to face the cam 7, causing the fishing rod 2 to move down. Now, if one brings the sensor 24 back to the position diametrically opposite to the up position X, the fishing rod 2 beings up-and-down motion for fish leading in the down position Y, and the fishing operation is started (see FIG. 13).

Not only when a fishing operation is to be suspended or started, but also when the fishing rod 2 is to be mounted or demounted, or a fish to be removed by hand, the same static backward position of the fishing rod 2 may be used similarly.

The above-described system incorporating fluidic elements for automatically controlling the angling cycle as well as the suspension and starting of fishing operations is only one embodiment of the present invention, which may be represented by other systems using different types of fluidic elements, such as NOT, OR, NOR, AND, and NAND elements, in different numbers and combinations, and based on different designs.

In summary, the present invention provides a means for automatically controlling nearly all steps involved in an angling cycle on a fishing vessel, namely, fish leading motion of the fishing rod in the down position, lifting of the rod with acceleration to the up position when a fish has been hooked, shaking of the rod in the up position, and throwing-down of the rod after the fish is unhooked, by automatic switching signals from fluidic elements, and also for remotely controlling the suspension and starting of fishing operations. Therefore, an apparatus according to the present invention can operate almost unattended to catch bonito and such other fast moving fish without losing opportunities.

Although the present invention has been described in conjunction with a preferred embodiment, it is to be understood that the invention is not limited to the apparatus shown in this embodiment but that design modifications may be resorted to without departing from the spirit of the invention.

I claim:

1. A fish angling arrangement, comprising in combination:
   a. a revolving shaft (5) coupled to a fishing rod (2) for holding a line (1), first mechanical means (10, 16) coupled to said revolving shaft for rotating said shaft so as to raise and lower said rod (2), a ring (6) mounted coaxially with said shaft, a first cam (7) for lowering said rod (2);
   b. a second cam (8), an acceleration sensor (25) actuated by said second cam (8) as a certain angle is reached;
   c. a hydraulic control valve (21) with a first fluidic terminal (59) coupled to said first mechanical means for controlling the mechanical means;
   d. hydraulic fluid flow means actuated by said second cam (8) including a second terminal (61), an acceleration control valve (23) actuated by said terminal, and second mechanical means responsive to said second control valve (23) accelerating the turning of said revolving shaft;
   e. a selector valve (3) connected to said rod (2) responsive to the weight of a fish pulling on said line (1); and,
   f. fluidic logic OR-NOR and flip-flop gating circuits (35, 39, 40) responsive to said selector valve (3) connected to said fluidic terminal (59), for controlling said first mechanical means, whereby the weight of a fish on said line (1) will enable said selector valve (3) causing air to flow through said logic circuits to said fluidic terminal, in turn, actuating said mechanical means turning the revolving means to lift thereon rod (2).

2. An arrangement as claimed in claim 1 including a second sensor (24) adjacent said revolving shaft, a third cam (9) on said shaft (5) and fluidic logic, control and third mechanical means to lower said rod (2) with a fish onto a vessel deck.

3. In a fish angling arrangement, in combination:
   a. a revolving shaft (5) coupled to a fishing rod (2) for holding a line (1), a ring (6) mounted coaxially with said shaft, a first cam (7) on said ring and a pinion (10) coupled to said revolving shaft and a rack (16) for driving the pinion for rotating said shaft so as to raise and lower said rod (2);
   b. hydraulic cylinder and piston means (11, 13) coupled to said rack (16) for driving said rack, a hydraulic control valve (21) with a fluidic terminal (59) coupled to said hydraulic cylinder for controlling the supply of oil thereto;
   c. a second cam (8) on said ring, an acceleration sensor (25), actuated by said second cam (8) as a certain angle is reached, hydraulic fluid flow means actuated by said second cam (8) including a second terminal (61), an acceleration control valve (23) actuated by said terminal, and a second rack-and-pinion arrangement responsive to said second control valve (23) accelerating the turning of said revolving shaft;
   d. a selector valve (3) connected to said rod (2) responsive to the weight of a fish pulling on said line (1), and;
   e. fluidic logic OR-NOR and flip-flop gating circuits (35, 39, 40) responsive to said selector valve (3) connected to said fluidic terminal (59), for controlling said hydraulic cylinder and piston means (11, 13), whereby the weight of a fish on said line (1) will enable said selector valve (3) causing air to flow through said logic circuits to said fluidic terminal which in turn causes oil to flow through said control valve (21) to said hydraulic cylinder, actuating said piston means moving the rack (16) turning the revolving means to lift thereon rod (2).

4. An arrangement as claimed in claim 3 including a second sensor (24) adjacent said revolving shaft, a third cam (9) on said shaft (5) for actuating said sensor (24) and fluidic logic control and gearing means responsive to said sensor to lower said rod (2) with a fish onto a vessel deck.

* * * * *